May 12, 1925.                                                                                   1,537,439
C. R. GRIFFITH
PRESS ROLL FOR PAPER MACHINES
Filed April 13, 1922
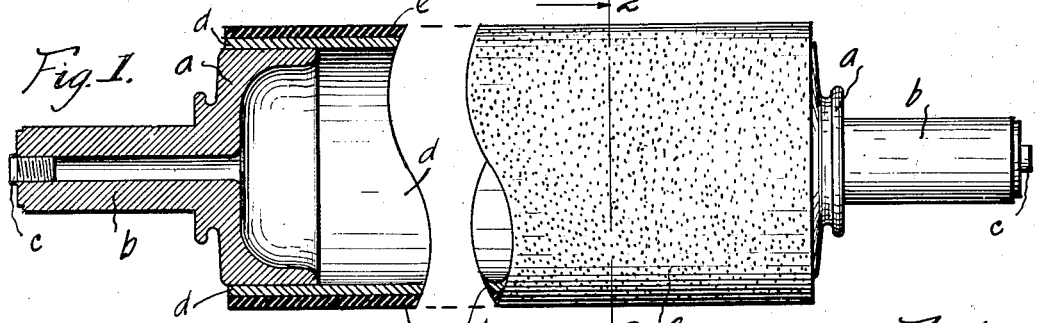
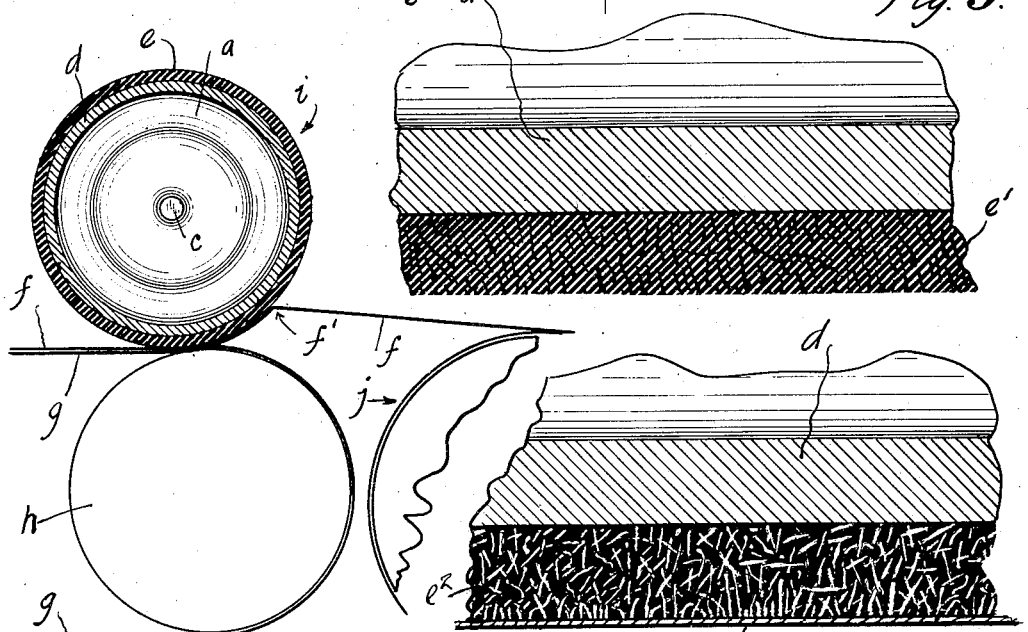
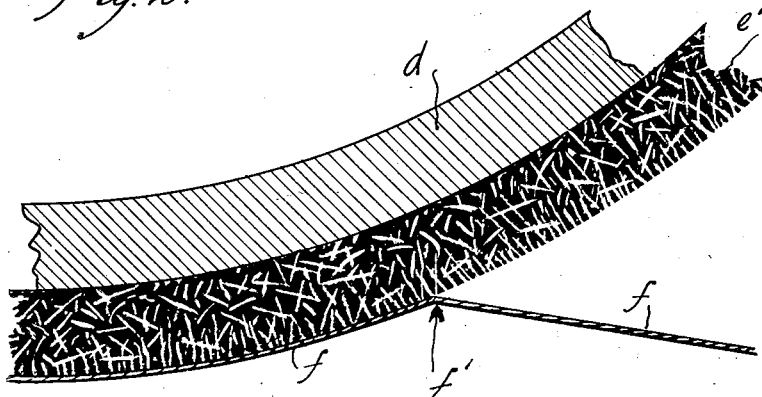
Inventor.
Charles R Griffith.
by F. J. Geisler
atty.

Patented May 12, 1925.

1,537,439

UNITED STATES PATENT OFFICE.

CHARLES R. GRIFFITH, OF PORTLAND, OREGON.

PRESS ROLL FOR PAPER MACHINES.

Application filed April 13, 1922. Serial No. 552,379.

*To all whom it may concern:*

Be it known that I, CHARLES R. GRIFFITH, a citizen of the United States, and a resident of Portland, county of Multnomah, and State of Oregon, have invented a certain new and useful Improvement in Press Rolls for Paper Machines, of which the following is a specification.

My invention relates to the press rolls of paper making machinery, the function of these rolls being, as well known, to express the surplus water from paper stock.

These press rolls have been made of metal also of granite, but the metal roll was found unsatisfactory, because the paper sheet had a tendency to adhere to them, and then would revolve with the roll and break the sheet; and the granite roll was too expensive, and too easily broken.

It was also known that wooden rolls possessed the required porous or cellular surface, in other words, provided with minute cells in their circumference, and which cells hold air thus effectively prevented the adhesion of the sheet to the roll. But suitable wood is hard to get. Wood is generally found to lack uniform texture, having soft spots and knots, and in consequence requires frequent re-turning, in order to keep it in true cylindrical form, as is essential, of course.

Furthermore, wood will not do for use with the making of straw paper, unless wrapped with cotton. And, besides wooden rolls have to be kept in damp saw dust when not in use, so as to prevent checking and cracking which would render them wholly unfit for press rolls.

Another source of annoyance is, that the pitch in the pulp stock has a tendency to adhere to a wooden roll, and thus necessitates frequent scrapings which tends to render the roll untrue, and requires frequent regrinding, and consequently is costly.

Another disadvantage of wood rolls is that only one degree of hardness can be obtained to meet the requirements of different kinds of paper.

Therefore the object of my invention is to make these press rolls of some substance which possesses the properties of hardness, smoothness and circumferential porosity; thus avoiding the adhering of the sheet to the roll by rendering the surface of the latter repellant.

I attain my object by making my press rolls of vulcanized rubber which I render porous or cellular at its circumference, by mixing with the raw rubber composition particles of cotton, or felt fibre, coarse saw dust, and the like, and then vulcanizing the rolls. Press rolls so produced require no wrapping, even when used for straw paper.

The said porous particles introduced in these vulcanized rubber rolls are not consumed by the heat of vulcanization, but being themselves inherently porous, provide the desired porosity and thus air cells in the circumference of the roll. Of course only the air cells in the circumference function, but as the roll is reground from time to time the interior pores or air cells are brought to the surface in turn.

The porosity of my rubber rolls may also be provided by mixing with the raw rubber composition carbonate of soda or ammonia, which substances are vaporized by the heat applied during vulcanization, leaving air cells. The said porosity may also be obtained by mixing with the rubber composition grass seed and like substances which are consumed by the heat of the vulcanizing process.

Another feature obtained by my invention is that a much lighter roll can be made, because as there is no great amount of wearing on the surface it need not be made very thick, and requires only enough material to give it rigidity. Furthermore, my improved press rolls can be made of any desired degree of hardness required by the particular conditions under which they are used.

The above describes the manners of making my improved press roll, and the article produced I have diagrammatically illustrated in the accompanying drawings, in which:

Fig. 1 is a a fragmentary view, partially sectional, of a roll embodying my invention;

Fig. 2 shows a pair of press rolls the upper of which embodies my invention and is shown in cross section on a line corresponding to 2—2 of the roll shown in Fig. 1; this view also shows the sheet of paper passing between the press rolls and carried to adjacent devices;

Fig. 3 is a larger scaled fragmentary section of my improved press roll diagrammatically illustrating the appearance of the composition surface when produced by mixing with the rubber composition, any other material which will be vaporized or consumed during vulcanization;

Fig. 4 is a similar fragmentary section as Fig. 3, except that the composition is in this instance assumed to have been formed by fibres of cotton or felt; and Fig. 5 is a fragmentary cross section of my improved press roll illustrating particularly the sheet repelling action due to the pores in the surface of the roll.

The roll shown is one of standard outline and construction and consists of end caps $a$ provided with hollow stub shafts $b$, which are plugged by means of plugs $c$. These end caps are pressed into the hollow metal cylinder $d$, which fits securely on the end caps, and is axially alined with the same so that the whole assembly is truly concentric. Over the cylinder $d$ is placed my rubber composition covering $e$.

This rubber covering is made porous so as to provide the circumferential repelling air cells.

In Fig. 3 I have indicated a porous surface in which the pores are indicated by the uneven black lines running across the thickness of the rubber composition material marked $e'$. In Fig. 4 the sheet of paper $f$ is shown in relation to the fibre composition surface $e^2$. The separate parts of Fig. 2 show the relations of the different rolls and conveyors in a paper machine, and of the sheet of paper passing therethrough. Referring further to Fig. 2, the sheet of paper $f$ approaches the press rolls on the wire conveyor $g$, and is considerably compressed between the bottom roll $h$ and the top roll $i$ which embodies my invention. Adhesion causes the paper to cling to the periphery of the roll $i$ to a point $f'$, but then the air cells act to repel, in other words break the adhesion and cause the paper to become released, so that it may pass to the felt conveyor $j$, from which it passes to other parts of the machinery.

My rubber press roll has a very tenacious and porous surface and meets all the requirements of a top press roll. It further-more successfully resists any appreciable wear, and will keep in good condition notwithstanding repeated re-grinding.

I claim:

1. A press roll, made of vulcanized rubber having pores providing air cells in the circumference thereof, to render the same repellent.

2. A press roll, made of vulcanized rubber composition having intermixed therewith other material, rendering the mass more or less porous, and thereby providing air cells in the circumference of the roll to render the same repellent.

3. A press roll made of vulcanized rubber, having cellular particles imbedded in its circumference, said particles constituting air cells thereby rendering the roll repellent.

4. In a press roll for a paper machine, a hollow cylinder, a covering for said cylinder made of vulcanized rubber having cellular particles imbedded in its circumference, said particles constituting air cells, thereby rendering the roll repellent.

5. In a press roll for a paper machine, a hollow cylinder, stub shafts fastened into the ends of said hollow cylinder, a covering for said cylinder made of vulcanized rubber having cellular particles imbedded in its circumference, said particles constituting air cells, thereby rendering the roll repellent.

6. A top press roll for paper making machines having an active surface composed of rubber and porous material.

7. A top press roll for paper making machines having its outer portion composed of rubber and porous fibrous material.

8. A top press roll for paper making machines having its outer portions composed of rubber and cellulose.

9. A top press roll for paper making machines comprising a metal core; and a homogeneous covering consisting of rubber compounded with finely ground cellulose, said covering being vulcanized to said core.

CHARLES R. GRIFFITH.